Patented Oct. 21, 1952

2,615,014

UNITED STATES PATENT OFFICE 2,615,014

NITROBENZENEAZO-N-DIFLUOROALKYL-N-HYDROXYALKYLANILINE DYE COMPOUNDS

Joseph B. Dickey, Kingsport, Tenn., assignor to Eastman Kodak Company, Rochester, N. Y., a corporation of New Jersey No Drawing. Application May 23, 1951, Serial No. 227,931

6 Claims. (Cl. 260—207.3)

This invention relates to new azo compounds containing a difluoroalkylamino group and their application to the art of dyeing or coloring textile materials made of or containing a cellulose alkyl carboxylic acid ester having two to four carbon atoms in the acid groups thereof.

It is known to prepare azo dyes containing a CF₃ group. However, so far as I am aware, in every instance the CF₃ group is directly attached to an aryl group. By contrast, the fluoroalkyl group present in the compounds of my invention is (1) joined to a benzene nucleus through an amino group rather than directly, (2) contains two rather than three fluorine atoms and (3) has two to five carbon atoms rather than a single carbon atom.

Angewandte Chemie, vol. 52, page 457 (1939) states that aminobenzotrifluoride and its derivatives when diazotized and coupled with Naphthol AS Grounding components give valuable color tones of exceptional light fastness. The combination of one of these aminobenzotrifluoride bases with Naphthol AS is said to be the red dye used in the German flag.

The Angewandte Chemie article refers to German Patents 551,882 (U. S. 1,999,610), 588,781 (U. S. 2,015,204) and 590,255 to illustrated the dye compounds mentioned in the article. These German patents disclose cotton ingrain azo dyes prepared by coupling diazotized aminobenzotrifluoride compounds with 2,3-oxynaphthoic acid arylides (Naphthol AS Grounding components). Although efforts have been made to apply Naphthol AS type dyes to cellulose acetate textile materials, these dye compounds have no utility for cellulose acetate textile materials. The dye compound

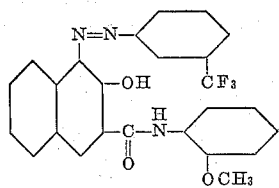

Compound 2 of tabulation of German Patent 551,882 is typical of the compounds disclosed by the three German patents above mentioned. Henne, in Gilman—Organic Chemistry—2nd ed.—page 963 (1943), alludes to the light-fast trifluoromethyl ingrain azo dyes discussed in the Angewandte Chemie article and states that the red dye used in the German flag "bears a CF₃ group on a naphthyl radical."

That many azo compounds having a CF₃ group are poor dyes for cellulose acetate textile materials will be further apparent from the fact that the following azo compounds yield dyeings on cellulose acetate textile materials which have poor fastness to light:

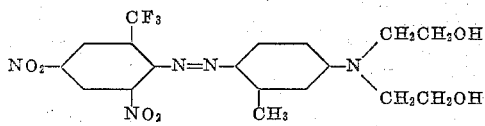

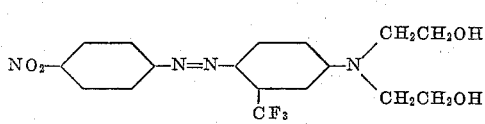

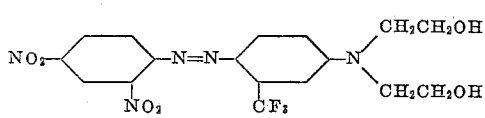

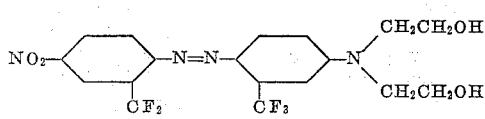

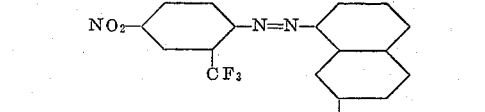

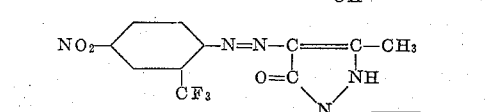

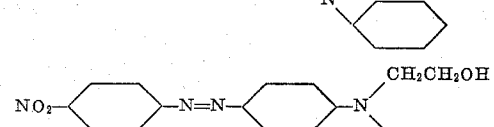

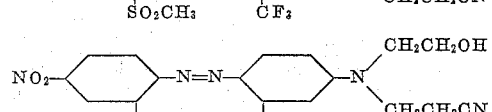

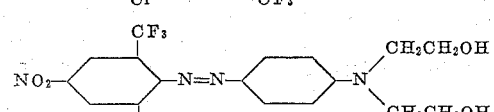

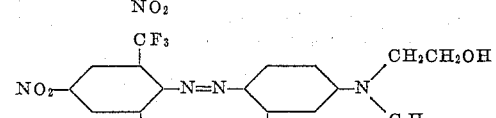

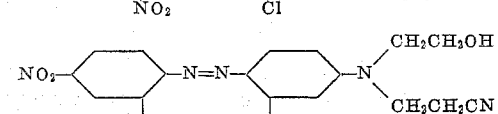

It will be understood that the foregoing dye compounds are merely illustrative of azo compounds containing a CF₃ group which yield dyeings on cellulose acetate textile materials having poor light fastness. There are many more such compounds.

After much investigation I have discovered that the azo compounds having the formula:

I 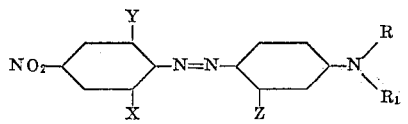

wherein R represents a β-hydroxyethyl group, a γ-hydroxypropyl group or a β,γ-dihydroxypropyl group, R₁ represents a 2,2-difluoroethyl group, a 2,2-difluoro-n-propyl group, a 3,3-difluoro-n-propyl group, a 3,3-difluoro-n-butyl group or a 4,4-difluoro-n-amyl group, X represents a hydrogen atom, a bromine atom or a chlorine atom, Y represents a hydrogen atom, a bromine atom, a chlorine atom, a fluorine atom, a methylsulfone group or a trifluoromethyl group, and wherein when X is a hydrogen atom Y also represents a

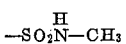

group or a

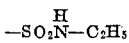

group and Z represents a hydrogen atom, a bromine atom, a chlorine atom, a methyl group or an ethyl group, are valuable dyes for coloring textile materials made of or containing a cellulose alkyl carboxylic acid ester having 2 to 4 carbon atoms in the acid groups thereof. They are particularly of use for the coloration of cellulose acetate textile materials. Depending upon their structure, they color the aforesaid textile materials orange, brownish-orange, scarlet, pinkish-red, red and rubine shades. They dyeings obtained in addition to having excellent fastness to gas possess unusually good fastness to light.

It is an object of my invention to provide new azo dye compounds. Another object is to provide a satisfactory process for the preparation of the new azo dye compounds of the invention. A further object is to provide dyed cellulose alkyl carboxylic acid ester textile materials which possess very good fastness to light and gas. A particular object is to provide new azo compounds which are especially of value for the dyeing of cellulose acetate textile materials.

By cellulose alkyl carboxylic acid esters having two to four carbon atoms in the acid groups thereof, I mean to include, for example, both hydrolyzed and unhydrolyzed cellulose acetate, cellulose propionate, cellulose butyrate, cellulose acetate-propionate and cellulose acetate-butyrate.

The new azo dye compounds of my invention are prepared by diazotizing a primary aromatic amine having the formula:

II 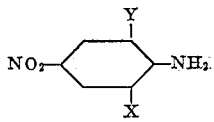

and coupling the diazonium compound obtained with a compound having the formula:

III 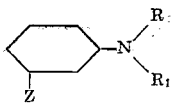

R, R₁, X, Y and Z in the foregoing formulas have the meaning previously assigned to them.

The aromatic amine compounds having the Formula II that are used in the preparation of the azo compounds of my invention are: p-nitroaniline, 4-nitro-2-chloroaniline, 4-nitro-2-bromoaniline, 4-nitro-2-fluoroaniline, 5-nitro-2-aminophenylmethylsulfone, 4-nitro-2-trifluoromethylaniline, 2-N-methylsulfoneamide 4-nitroaniline, 2-N-ethylsulfoneamide - 4 - nitroaniline, 4-nitro-2,6-dichloroaniline, 4-nitro-2-chloro-6-bromoaniline, 4 - nitro - 2 - chloro - 6 - fluoroaniline, 4 - nitro - 2 - methylsulfone - 6 - chloroaniline, 4 - nitro - 2 - trifluoromethyl - 6 - chloroaniline, 4-nitro-2,6-dibromoaniline, 4-nitro-2-bromo-6-fluoroaniline, 4-nitro-2-methylsulfone-6-bromoaniline and 4-nitro-2-trifluoromethyl-6-bromoaniline.

Typical of the coupling compounds (Formula III) that are used in the preparation of the azo compounds of my invention are: N-2,2-difluoroethyl - N - β - hydroxyethylaniline, N - 2,2-difluoro-n-propyl-N-β-hydroxyethylaniline, N-3,-3 - difluoro - n - propyl - N - β - hydroxyethylaniline, N-3,3-difluoro-n-butyl-N-β-hydroxethylaniline, N-2,2-difluoroethyl-N-β,γ-dihydroxypropylaniline, N-2,2-difluoro-n-propyl-N-β,γ-dihydroxypropylaniline, N-3,3-difluoro-n-propyl-N-β,γ-dihydroxypropylaniline,N-3,3-difluoro-n-propyl-N-β,γ-dihydroxypropylaniline, N-2,2-difluoroethyl - N - β - hydroxyethyl - m - chloroaniline, N-2,2-difluoro-n-propyl-N-β-hydroxyethyl-m-chloroaniline, N-3,3-difluoro-n-propyl-N - β - hydroxyethyl - m - chloroaniline, N - 3,3-difluorobutyl - N - β - hydroxyethyl - m - chloroaniline, N-2,2-difluoroethyl-N-β,γ-dihydroxypropyl-m-chloroaniline, N-2,2-difluoro-n-propyl-N-β,γ - dihydroxypropyl - m - chloraniline, N - 3,3-difluoro - n-propyl - N - β,γ - dihydroxypropyl-m-chloroaniline, N-3,3-difluoro-n-butyl-N-β,γ-dihydroxypropyl-m-chloroaniline, N-2,2-difluoroethyl - N - β - hydroxyethyl - m - toluidine, N-2,2 - difluoro - n - propyl - N - β - hydroxyethyl-m - toluidine, N - 3,3 - difluoro-n-propyl-N-β-hydroxyethyl-m-toluidine, N - 3,3-difluoro-n-butyl-N-β-hydroxyethyl-m-toluidine, N-2,2-difluoroethyl-N-β,γ-dihydropropyl-m-toluidine, N-2,2-difluoro - n - propyl - N - β,γ - dihydroxypropyl-m-toluidine, N-3,3-difluoro-n-propyl-N-β,γ-dihydroxypropyl - m - toluidine, N - 3,3 - difluoro-n - butyl - N - β,γ - dihydroxypropyl - m - toluidine, N-4,4-difluoro-n-amyl-N-β-hydroxyethylaniline, N - 4,4 -difluoro - n - amyl - N - β - hydroxyethyl - m - chloroaniline, N - 2,2 - difluoroethyl - N - β - hydroxyethyl - m - bromoaniline, N - 2,2 - difluoroethyl - N - β - hydroxyethyl-m-ethylaniline, N-2,2-difluoroethyl-N-γ-hydroxypropyl-m-bromoaniline, N-2,2-difluoro-n-propyl-N - β - hydroxyethyl - m - bromoaniline, N - 2,2-difluoro - n - propyl - N - β - hydroxyethyl - m-ethylaniline, N - 3,3 - difluoro-n - propyl - N-β-hydroxyethyl-m-bromoaniline, N-3,3-difluoro-n - propyl - N - β - hydroxyethyl - m - ethylaniline, N - 3,3 - difluoro - n - butyl - N - β - hydroxyethyl-m-bromoaniline,N-3,3-difluoro-n-butyl-N-β-hydroxyethyl-m-ethylaniline, N-2,2-difluoroethyl-N-β,γ-dihydroxypropyl-m-bromoaniline and N - 2,2 - difluoroethyl - N - β,γ - dihydroxypropyl-m-ethylaniline.

It should be here noted that not all azo compounds having a 2,2-difluoroethylamino group, a 2,2-difluoro-n-propylamino group, a 3,3-difluoro-n-propylamino group, a 3,3-difluoro-n-butylamino group or a 4,4-difluoro-n-amylamino group yield dyeings on cellulose acetate textile materials which have good fastness to light. A number of such compounds are referred to hereinafter.

To illustrate, the azo compounds obtained by coupling the coupling compounds of my invention with the diazonium form of 2,4-dinitro-6-chloroaniline, 2,4-dinitro-6-bromoaniline, 3,5-dinitro-2-aminophenylmethylsulfone, 2,4-dinitro-6-trifluoromethylaniline and 6-N-ethylsulfoneamide-2,4-dinitroaniline yield dyeings on cellulose acetate textile materials which do not have good fastness to light. Similarly, the azo compounds prepared by diazotizing a compound having the Formula II and coupling the diazonium compound obtained with a compound having the formula:

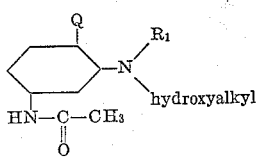

where $R_1$ represents a 2,2-difluoroethyl group, a 2,2-difluoro-n-propyl group, a 3,3-difluoro-n-propyl group, a 3,3-difluoro-n-butyl group or a 4,4-difluoro-n-amyl group and Q represents a hydrogen atom or a methoxy group yield dyeings on cellulose acetate textile materials which do not have good fastness to light.

Also, the azo compounds obtained by diazotizing o-nitroaniline, 2-nitro-4-chloroaniline and 4-nitro-2-hydroxyaniline and coupling the diazonium compounds obtained with the coupling compounds of the present invention yield dyeings on cellulose acetate textile materials which do not have good fastness to light.

While the azo compounds of my invention yield dyeings on cellulose acetate textile materials which possess unusually good fastness to light and excellent fastness to gas, those compounds wherein $R_1$ is a 2,2-difluoroethyl group are preferred. In general, these latter compounds are more light fast than the corresponding compounds wherein $R_1$ is one of the other difluoroalkyl groups. Again, those compounds wherein R is a β-hydroxyethyl group are preferred because they are, in general, more light fast than the corresponding compounds wherein R is a γ-hydroxypropyl group or a β,γ-dihydroxypropyl group. From the foregoing, it logically follows that those compounds wherein R and $R_1$ are simultaneously a 2,2-difluoroethyl group and a β-hydroxyethyl group, respectively, are preferred.

The following examples illustrate the azo compounds of my invention and their manner of preparation.

EXAMPLE 1

A. *Preparation of nitrosyl sulfuric acid*

7.6 grams of dry sodium nitrite were added with stirring to 50 cc. of sulfuric acid (sp. gr. 1.84) while keeping the temperature below 70° C. The resulting reaction mixture was then cooled to 15° C.–20° C. and 100 grams of acetic acid were added dropwise with stirring, following which the reaction mixture was cooled to 8° C.–10° C.

B. *Diazotization*

21.6 grams of finely powdered 5-nitro-2-aminophenyl-methylsulfone were added slowly, with stirring, to the nitrosyl-sulfuric acid reaction mixture prepared as described above. The reaction temperature was maintained below 20° C. After the addition of the amine, 100 grams of acetic acid were added dropwise with stirring and the reaction mixture was stirred at 15° C.–20° C. until all of the amine had dissolved and the diazotization reaction which takes place was complete. The diazonium solution was then poured onto 500 grams of crushed ice, and enough urea or sulfamic acid was added to destroy the excess nitrous acid. The diazonium solution should be clear and free of suspended undiazotized amine.

C. *Coupling*

10 grams of sulfuric acid (sp. gr. 1.84) were added to 20 cc. of water and the resulting solution was cooled to 5° C. and then 20.1 grams of N-2,2-difluoroethyl-N-β-hydroxyethylaniline were added while cooling. When solution was complete, 200 grams of crushed ice and 200 cc. of ice cold water were added to the reaction mixture. Then the diazonium solution prepared, as described above, was added with stirring. Upon completion of the coupling reaction which takes place, sufficient sodium carbonate to neutralize the mineral acid present was slowly added to the reaction mixture. Sufficient diazonium solution should be used to give a slight positive test (for a diazo solution) when all the coupling component has reacted. The dye compound formed was recovered by filtration on a Büchner funnel, washed free of salts with water and air dried. The yield of dye melting at 125° C.–130° C. was 40.6 grams. It has the formula:

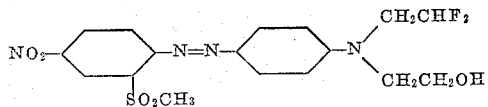

and colors cellulose acetate textile materials scarlet shades of excellent fastness to light and gas.

In like manner by the use of 22.9 grams of N-3,3-difluoro-n-butyl-N-β-hydroxyethylaniline in place of N-2,2-difluoroethyl-N-β-hydroxyethylaniline, 43.3 grams of a dye melting at 170° C.–175° C. was obtained. It colors cellulose acetate textile materials rubine shades of excellent fastness to light and gas.

By contrast, the azo compound of the formula:

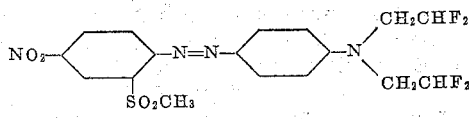

colors cellulose acetate textile materials yellowish-orange shades which have poor fastness to light.

EXAMPLE 2

A. *Diazotization*

17.3 grams of 4-nitro-2-chloroaniline were stirred into a solution of 7 cc. of sulfuric acid (sp. gr. 1.84) in 200 cc. of water. Sufficient ice was added to maintain a temperature of 5° C.–10° C. during the diazotization which was performed by adding a solution of 7.5 grams of sodium nitrite in 20 cc. of water. Stirring was continued during the diazotization reaction and when the diazotization reaction was complete, the reaction mixture was filtered and any excess nitrous acid was destroyed by adding urea or sulfamic acid.

B. *Coupling*

10 grams of sulfuric acid (sp. gr. 1.84) were added to 20 cc. of water and the resulting solution was cooled to 5° C. and then 20.1 grams of N-2,2-difluoroethyl-N-β-hydroxyethylaniline were added while cooling. When solution was complete, 100 grams of crushed ice and 100 grams of ice cold water were added to the reaction mixture. Then the diazonium solution prepared as described above was added with stirring. Upon completion of the coupling reaction which takes place, sufficient sodium carbonate to just neutralize the mineral acid present was added. Sufficient diazonium solution should be used to give a slight positive test (for a diazo solution) when all the coupling component has reacted. The dye compound formed was recovered by filtration on a Büchner funnel, washed free of salts with water and dried. The yield of dye melting at 150° C.–154° C. was 37.4 grams. It has the formula:

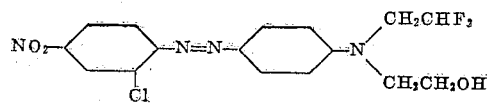

and colors cellulose acetate textile materials scarlet shades.

By the use of 21.7 grams of 4-nitro-2-bromoaniline and 15.6 grams of 4-nitro-2-fluoroaniline, respectively, in place of 4-nitro-2-chloroaniline azo dye compounds are obtained which color cellulose acetate textile materials scarlet shades.

EXAMPLE 3

A. *Diazotization*

20.7 grams of 4-nitro-2,6-dichloroaniline were added portionwise, with stirring, to a nitrosyl sulfuric acid mixture prepared as described in Example 1 and simultaneously 100 grams of cold glacial acetic acid were added. The reaction mixture was stirred while keeping the temperature at about 15° C. until the diazotization reaction was complete. A clear, yellowish diazonium solution was obtained.

B. *Coupling*

20.1 grams of N-2,2-difluoroethyl-N-β-hydroxyethylaniline were dissolved in 300 cc. of 12½% sulfuric acid. The resulting solution was cooled to 0° C.–10° C. by adding crushed ice with stirring. Then the diazonium solution prepared as described above was added to the reaction mixture with stirring. Coupling takes place rapidly. The reaction mixture was cooled, with crushed ice, for example, as needed, to keep the reaction temperature at about 10° C.–15° C. The reaction mixture was stirred for about one-half hour after the addition of the diazonium solution and then slowly made neutral to Congo red paper with sodium bicarbonate after which it was allowed to stand for 1 hour. The dye compound formed was recovered by filtration, washed free of any salts with water and dried. The azo dye compound thus obtained has the formula:

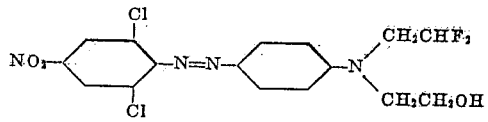

It colors cellulose acetate textile materials orange shades which have excellent fastness to light and gas.

By the use of 21.5 grams of N-2,2-difluoro-n-propyl-N-β-hydroxyethylaniline in place of N-2,2-difluoroethyl-N-β-hydroxy-ethylaniline, an azo dye compound is obtained which colors cellulose acetate textile materials orange shades which have excellent fastness to light and gas.

By way of contrast, the azo compound of the formula:

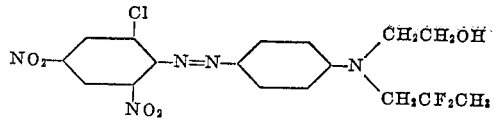

colors cellulose acetate textile materials orange shades which have poor fastness to light.

EXAMPLE 4

24.1 grams of 4-nitro-2-trifluoromethyl-6-chloroaniline are diazotized in accordance with the procedure described in Example 3 and the diazonium compound obtained is coupled with 20.1 grams of N-2,2-difluoroethyl-N-β-hydroxyethylaniline. Coupling and recovery of the dye compound formed is carried out in accordance with the procedure described in Example 3. The dye compound obtained colors cellulose acetate textile materials brownish-orange shades.

By the use of 21.5 grams of N-2,2-difluoroethyl-N-γ-hydroxypropylaniline and 24.5 grams of N-2,2-difluoroethyl-N-β,γ-dihydroxypropylaniline, respectively, in place of N-2,2-difluoroethyl-N-β-hydroxyethylaniline, dye compounds are obtained which similarly color cellulose acetate textile materials brownish-orange shades.

EXAMPLE 5

28.5 grams of 4-nitro-2-trifluoromethyl-6-bromoaniline are diazotized in accordance with the procedure described in Example 3 and the diazonium compound obtained is coupled with 21.5 grams of N-2,2-difluoroethyl-N-β-hydroxyethyl-m-toluidine. Coupling and recovery of the dye compound formed is carried out in accordance with the procedure described in Example 3. The dye compound obtained colors cellulose acetate textile materials brownish-orange shades.

By the use of 20.1 grams of N-2,2-difluoroethyl-N-β-hydroxyethylaniline and 21.5 grams of N-3,3-difluoro-n-propyl-N-β-hydroxyethylaniline, respectively, in place of N-2,2-difluoroethyl-N-β-hydroxyethyl-m-toluidine, dye compounds are obtained which color cellulose acetate textile materials brownish-orange shades.

EXAMPLE 6

21.6 grams of 5-nitro-2-aminophenylmethylsulfone are diazotized in accordance with procedure described in Example 1 and the diazonium compound obtained is coupled with 25.9 grams of N-3,3-difluoro-n-butyl-N-β,γ-dihydroxypropylaniline. Coupling and recovery of the dye compound formed is carried out in accordance with the procedure described in Example 1. The dye compound obtained colors cellulose acetate textile materials rubine shades.

By the use of 24.3 grams of N-3,3-difluoro-n-butyl- N-γ-hydroxypropylaniline and 23.1 grams of N-2,2-difluoroethyl-N-β,γ-dihydroxypropylaniline, respectively, in place of N-3,3-difluoro-n-butyl-N-β,γ-dihydroxypropylaniline, dye compounds are obtained which color cellulose acetate textile materials rubine shades.

EXAMPLE 7

17.3 grams of 4-nitro-2-chloroaniline are diazotized in accordance with the procedure described in Example 2 and the diazonium compound obtained is coupled with 24.3 grams of N-4,4-difluoro-n-amyl-N-β-hydroxyethylaniline. Coupling and recovery of the dye compound formed is carried out in accordance with the procedure described in Example 2. The dye compound obtained colors cellulose acetate textile materials rubine shades which have excellent fastness to light and gas.

By the use of 13.8 grams of p-nitroaniline in place of 4-nitro-2-chloroaniline, a dye compound is obtained which colors cellulose acetate textile materials orange shades which have very good fastness to light and gas.

By contrast, the azo compound of the formula:

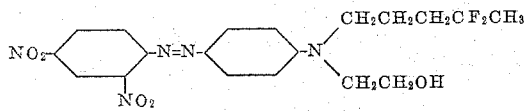

colors cellulose acetate textile materials rubine shades which have poor fastness to light.

EXAMPLE 8

20.6 grams of 4-nitro-2-trifluoromethylaniline are diazotized in accordance with the procedure described in Example 2 and the diazonium compound obtained is coupled with 20.1 grams of N-2,2-difluoroethyl - N - β - hydroxyethylaniline. Coupling and recovery of the dye compound formed is carried out in accordance with the procedure described in Example 2. The dye compound obtained colors cellulose acetate textile materials red shades.

By the use of 24.5 grams of N-2,2-difluoroethyl-N-β,γ-dihydroxypropylaniline and 28.7 grams of N-4,4-difluoro-n-amyl - N-β,γ-dihydroxypropylaniline, respectively, in place of N-2,2-difloroethyl-N-β-hydroxyethylaniline, dye compounds are obtained which color cellulose acetate textile materials red shades.

EXAMPLE 9

20.6 grams of 4-nitro-2-trifluoromethylaniline are diazotized in accordance with the procedure described in Example 2 and the diazonium compound obtained is coupled with 24.9 grams of N-3,3-difluoro-n-propyl - N - β-hydroxyethyl-m-chloroaniline. Coupling and recovery of the dye compound formed is carried out in accordance with the procedure described in Example 2. The dye compound obtained colors cellulose acetate textile materials red shades.

By the use of 29.4 grams of N-3,3-difluoro-n-propyl-N - β - hydroxyethyl - m - bromoaniline in place of N-3,3-difluoro-n-propyl-N-β-hydroxyethyl-m-chloroaniline, a dye compound is obtained which colors cellulose acetate textile materials red shades.

EXAMPLE 10

20.6 grams of 4-nitro-2-trifluoromethylaniline are diazotized in accordance with the procedure described in Example 2 and the diazonium compound obtained is coupled with 27.3 grams of N-2,2-difluoroethyl-N-β,γ - dihydroxypropyl-m-ethylaniline. Coupling and recovery of the dye compound formed is carried out in accordance with the procedure described in Example 2. The dye compound obtained colors cellulose acetate textile materials rubine shades.

By the use of 25.9 grams of N-2,2-difluoroethyl-N-β,γ-dihydroxypropyl-m-toluidine in place of N-2,2-difluoroethyl-N-β,γ - dihydroxypropyl-m-ethylaniline, a dye compound is obtained which colors cellulose acetate textile materials rubine shades.

EXAMPLE 11

21.6 grams of 5-nitro-2-aminophenylmethylsulfone are diazotized in accordance with the procedure described in Example 1 and the diazonium compound obtained is coupled with 25.9 grams of N-2,2-difluoroethyl - N-β,γ - dihydroxypropyl-m-toluidine. Coupling and recovery of the dye compound formed is carried out in accordance with the procedure described in Example 1. The dye compound obtained colors cellulose acetate textile materials rubine shades.

By the use of 27.3 grams of N-2,2-difluoroethyl-N-β,γ-dihydroxypropyl-m-ethylaniline in place of N-2,2-difluoroethyl - N-β,γ - dihydroxypropyl-m-toluidine, a dye compound is obtained which colors cellulose acetate textile materials rubine shades.

EXAMPLE 12

24.1 grams of 4-nitro-2-trifluoromethyl-6-chloroaniline are diazotized in accordance with the procedure described in Example 3 and the diazonium compound obtained is coupled with 21.5 grams of N-2,2-difluoro-n-propyl-N-β-hydroxyethylaniline. Coupling and recovery of the dye compound formed is carried out in accordance with the procedure described in Example 3. The dye compound obtained colors cellulose acetate textile materials brownish-orange shades which have excellent fastness to light and gas.

By contrast, the azo compound of the formula:

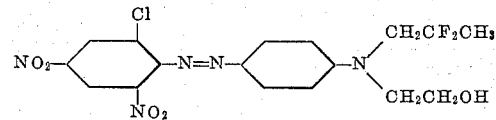

colors cellulose acetate textile materials rubine shades which have poor fastness to light.

EXAMPLE 13

20.7 grams of 4-nitro-2,6-dichloroaniline are diazotized in accordance with the procedure described in Example 3 and the diazonium compound obtained is coupled with 24.9 grams of N - 2,2 - difluoro - n - propyl - N - β - hydroxyethyl-m-chloraniline. Coupling and recovery of the dye compound formed is carried out in accordance with the procedure described in Example 3. The dye compound obtained colors cellulose acetate textile materials orange shades.

By the use of 25.2 grams of 4-nitro-2-bromo-6-chloro-aniline in place of 4-nitro-2,6-dichloroaniline, a dye compound is obtained which colors cellulose acetate textile materials orange shades.

EXAMPLE 14

20.7 grams of 4-nitro-2,6-dichloroaniline are diazotized in accordance with the procedure described in Example 3 and the diazonium compound obtained is coupled with 26.3 grams of N - 3,3 - difluoro - n - butyl - N - β - hydroxyethyl-m-chloroaniline. Coupling and recovery of the dye compound formed is carried out in accordance with the procedure described in Example 3. The dye compound obtained colors cellulose acetate textile materials orange shades.

By the use of 28 grams of N-3,3-difluoro-n-butyl-N-β-hydroxyethyl-m-bromoaniline and 27.7 grams of N-4,4-difluoro-n-amyl-N-β-hydroxyethyl-m-chloroaniline, respectively, in place of N - 3,3 - difluoro - n - butyl - N - β - hydroxyethyl-m-chloroaniline, dye compounds are obtained which color cellulose acetate textile materials orange shades.

EXAMPLE 15

19.2 grams of 4-nitro-2-fluoro-6-chloroaniline are diazotized in accordance with the procedure described in Example 3 and the diazonium compound obtained is coupled with 20.1 grams of N - 2,2 - difluoroethyl - N - β - hydroxyethylaniline. Coupling and recovery of the dye compound formed is carried out in accordance with the procedure described in Example 3. The dye compound obtained colors cellulose acetate textile materials orange shades.

By the use of 25.7 grams of N-4,4-difluoro-n-amyl-N-γ-hydroxypropylaniline in place of N-2,2 - difluoroethyl - N - β - hydroxyethylaniline, a dye compound is obtained which colors cellulose acetate textile materials orange shades.

EXAMPLE 16

13.8 grams of p-nitroaniline are diazotized in accordance with the procedure described in Example 2 and the diazonium compound obtained is coupled with 22.9 grams of N-3,3-difluoro-n-butyl-N-β-hydroxyethylaniline. Coupling and recovery of the dye compound formed is carried out in accordance with the procedure described in Example 2. The dye compound obtained colors cellulose acetate textile materials orange shades.

By the use of 22.9 grams of N-3,3-difluoro-n-propyl-N-β-hydroxyethyl-m-toluidine in place of N - 3,3 - difluoro - n - butyl - N - β - hydroxyethylaniline, a dye compound is obtained which colors cellulose acetate textile materials red shades.

EXAMPLE 17

25.1 grams of 4-nitro-2-methylsulfone-6-chloroaniline are diazotized in accordance with the procedure described in Example 3 and the diazonium compound obtained is coupled with 20.1 grams of N - 2,2 - difluoroethyl - N - β - hydroxyethylaniline. Coupling and recovery of the dye compound formed is carried out in accordance with the procedure described in Example 3. The dye compound obtained colors cellulose acetate textile materials orange shades.

By the use of 21.5 grams of N-2,2-difluoro-n-propyl-N-β-hydroxyethylaniline in place of N-2,2-difluoroethyl-N-β-hydroxyethylaniline a dye compound is obtained which colors cellulose acetate textile materials orange shades.

EXAMPLE 18

29.6 grams of 4-nitro-2-methylsulfone-6-bromoaniline are diazotized in accordance with the procedure described in Example 3 and the diazonium compound obtained is coupled with 25.9 grams of N-3,3-difluoro-n-propyl-N-β,γ-dihydroxypropylaniline. Coupling and recovery of the dye compound formed is carried out in accordance with the procedure described in Example 3. The dye compounds obtained colors cellulose acetate textile materials orange shades.

By the use of 21.5 grams of N-2,2-difluoroethyl-N-β-hydroxyethyl-m-toluidine in place of N-3,3-difluoro - n - propyl - N - β,γ - dihydroxypropylaniline, a dye compound is obtained which colors cellulose acetate textile materials orange shades.

EXAMPLE 19

24.5 grams of 2-N-ethylsulfonamide-4-nitroaniline are diazotized in accordance with the procedure described in Example 1 and the diazonium compound obtained is coupled with 20.1 grams of N-2,2-difluoroethyl-N-β-hydroxyethylaniline. Coupling and recovery of the dye compound formed is carried out in accordance with the procedure described in Example 1. The dye compound obtained colors cellulose acetate textile materials red shades which have very good fastness to light.

By the use of 27.3 grams of N-3,3-difluoro-n-butyl-N-β,γ-dihydroxypropylaniline in place of N-2,2-difluoroethyl-N-β-hydroxyethylaniline, a dye compound is obtained which colors cellulose acetate textile materials red shades which have very good fastness to light.

By contrast, the azo compound of the formula:

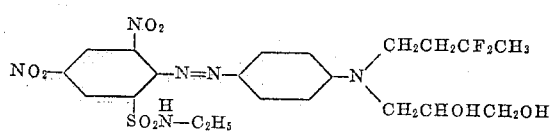

colors cellulose acetate textile materials reddish-violet shades which have poor fastness to light.

EXAMPLE 20

23.1 grams of 2-N-methylsulfonamide-4-nitroaniline are diazotized in accordance with the procedure described in Example 1 and the diazonium compound obtained is coupled with 20.1 grams of N-2,2-difluoroethyl-N-β-hydroxyethylaniline. Coupling and recovery of the dye compound formed is carried out in accordance with the procedure described in Example 1. The dye compound obtained colors cellulose acetate textile materials red shades.

By the use of 22.9 grams of N-3,3-difluoro-n-butyl-N-β-hydroxyethylaniline in place of N-2,2-difluoroethyl-N-β-hydroxyethylaniline, a dye compound is obtained which colors cellulose acetate textile materials red shades.

Following the procedure described in Examples 1 to 20, inclusive, the dye compounds indicated hereinafter were prepared. The color is that which the dyes give on cellulose acetate textile materials.

| Diazo Component | Coupling Component | Color |
|---|---|---|
| 5 - nitro - 2 - aminophenyl - methylsulfone. | N - 3,3 - difluoro - n - butyl - N - β - hydroxyethyl - m - toluidine. | Rubine. |
| Do | N - 2,2 - difluoroethyl - N - β - hydroxyethyl - m - toluidine. | Do. |
| 4 - nitro - 2 - trifluoromethylaniline. | N - 2,2 - difluoroethyl - N - γ - hydroxypropylaniline. | Red. |
| Do | N - 3,3 - difluoro - n - butyl - N - β - hydroxyethylaniline. | Do. |
| Do | N - 3,3 - difluoro - n - butyl - N - β,γ - dihydroxypropylaniline. | Do. |
| Do | N - 2,2 - difluoroethyl - N - β - hydroxyethyl - m - chloroaniline. | Do. |
| Do | N - 2,2 - difluoroethyl - N - β - hydroxyethyl - m - toluidine. | Rubine. |
| Do | N - 2,2 - difluoroethyl - N - β, γ - dihydroxypropyl - m - toluidine. | Do. |
| 4 - nitro - 2 - trifluoromethyl - 6 - chloroaniline. | N- 2,2 - difluoroethyl - N -β - hydroxyethyl - m - toluidine. | Brownish-Orange. |
| Do | N - 2,2 - difluoroethyl - N - β - hydroxyethyl - m - chloroaniline. | Do. |
| 4 - nitro - 2 - trifluoromethyl - 6 - chloroaniline. | N - 2,2 - difluoro - n - propyl - N - β - hydroxyethyl - m - chloroaniline. | Do. |
| Do | N - 2,2 - difluoro - n - propyl - N - γ - hydroxypropylaniline. | Do. |
| 4-nitroaniline | N - 2,2 - difluoroethyl - N - β - hydroxyethylaniline. | Orange. |
| 4 - nitro - 2,6 - dichloroaniline | N - 3,3 - difluoro - n - butyl - N - β - hydroxyethylaniline. | Do. |
| Do | N - 4,4 - difluoro - n - amyl - N - β - hydroxyethylaniline. | Do. |
| 5 - nitro - 2 - aminophenyl-methylsulfone | N - 4,4 - difluoro - n - amyl - N - β - hydroxyethylaniline. | Rubine. |
| Do | N - 4,4 - difluoro - n - amyl - N - β - hydroxyethyl - m - toluidine. | Do. |

While not all of the compounds of my invention have been specifically described, the manner of preparing any of the compounds is believed to be obvious from the numerous examples given hereinbefore.

Dye compounds corresponding to those described hereinbefore but which contain at least one —$OSO_3H$ group or this group in its salt form have also been prepared. These dye compounds containing a sulfato group are prepared either by introducing a sulfato group into the dye compounds previously described or by introducing a sulfato group into the coupling components of the present invention and coupling the compounds thus obtained with the diazonium compounds used in the preparation of the new azo compounds of the invention. These new dye compounds are suitable for dyeing the textile materials mentioned hereinbefore as well as silk, wool and nylon textile materials. Because of the increased water solubility of these new dye compounds, they are particularly adapted for dyeing cones of yarn and fabrics of close weave and of heavy construction.

The following examples illustrate the manner in which these new sulfato dye compounds are prepared.

EXAMPLE 21

42.7 grams of

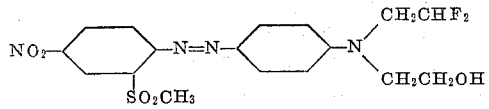

are dissolved in 500 cc. of carbon tetrachloride and the resulting solution is cooled to 10° C. Then 12.7 grams of freshly distilled chlorosulfonic acid are added dropwise with stirring over a period of 3 hours. After the addition of the chlorosulfonic acid, the reaction mixture is slowly warmed to 50° C. and maintained at this temperature for several hours. Heating is then discontinued and the carbon tetrachloride is distilled off under reduced pressure. 300 cc. of ice and water are then added to the reaction mixture and the dye is recovered by evaporation. If a salt form of the dye is desired, the evaporation step is omitted. Instead, following the addition of the 300 cc. of ice and water, the reaction mixture is neutralized with sodium hydroxide (other suitable organic or inorganic bases can be used) warmed to dissolve the dye, filtered to remove any insoluble material and then concentrated under reduced pressure until the dye separates. The dye compound thus obtained has the formula:

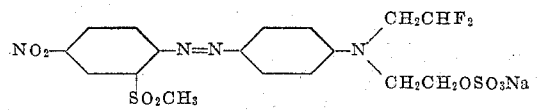

It colors cellulose acetate, wool, nylon and silk textile materials red shades from an aqueous solution or suspension.

EXAMPLE 22

38.3 grams of 2-chloro-4-nitrobenzeneazo-N-2,2 - difluoroethyl-N-β-hydroxyethylaniline are dissolved in 200 cc. of pyridine and the resulting solution is cooled to 5° C. Then 12.7 grams of chlorosulfonic acid are added dropwise with stirring over a period of 3 hours. Stirring is continued for an additional 2 hours following which the reaction mixture is heated to 50° C. and maintained at this temperature for two hours. Following this the reaction mixture is cooled and the pyridine is removed under reduced pressure. 300 cc. of ice and water are then added to the reaction mixture and the dye is recovered by evaporation. The dye compound obtained colors cellulose acetate textile materials scarlet shades.

EXAMPLE 23

41.7 grams of 4-nitro-2,6-dichlorobenzeneazo-N-2,2-difluoroethyl-N-β-hydroxyethylaniline are mixed with 50 cc. of sulfuric acid (sp. gr. 1.84) and the reaction mixture resulting is warmed to 50° C. for 3 hours and then cooled to 0° C. 200 cc. of ice and water are added and the reaction mixture is made neutral to Congo red paper with sodium bicarbonate. The dye compound formed is recovered by filtration and washed with cold salt water. The dye compound thus obtained colors cellulose acetate, silk, wool, and nylon orange shades.

EXAMPLE 24

20.6 grams of 4-nitro-2-trifluoromethylaniline are diazotized in accordance with the procedure described in Example 2 and the diazonium compound obtained is coupled with 42.7 grams of the sodium salt of N-2,2-difluoro-n-propyl-N-β-sulfatoethylaniline. Coupling and recovery of the dye compound formed is carried out in accordance with the procedure described in Example 2. The dye compound obtained colors cellulose acetate, wool, silk, and nylon red shades.

EXAMPLE 25

45.7 grams of the dye compound obtained as described in Example 19 are dissolved in 500 cc. of carbon tetrachloride and the resulting solution is cooled to 10° C. Then 12.7 grams of freshly distilled chlorosulfonic acid are added dropwise with stirring over a period of 3 hours. After the addition of the chlorosulfonic acid, the reaction mixture is slowly warmed to 50° C. and maintained at this temperature for several hours. Heating is then discontinued and the carbon tetrachloride is distilled off under reduced pressure. 300 cc. of ice and water are then added to the reaction mixture after which the reaction mixture is neutralized with an aqueous sodium hydroxide solution, warmed to dissolve the dye, filtered to remove any insoluble material and then concentrated under reduced pressure until the dye separates. The dye compound thus obtained has the formula:

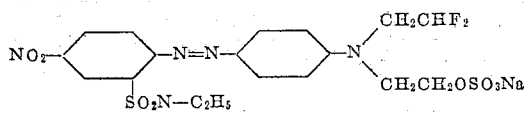

It colors cellulose acetate, wool, nylon and silk textile materials red shades.

EXAMPLE 26

44.3 grams of 2-(N-methylsulfonamide)-4-nitrobenzeneazo - N - 2,2 - difluoroethyl-N-β-hydroxyethylaniline (dye of Example 20) are dissolved in 200 cc. of pyridine and the resulting solution is cooled to 5° C. Then 12.7 grams of chlorosulfonic acid are added dropwise with stirring over a period of 3 hours. Stirring is continued for an additional 2 hours following which the reaction mixture is heated to 50° C. and maintained at this temperature for two hours. Following this the reaction mixture is cooled and the pyridine is removed under reduced pressure. 300 cc. of ice and water are then added to the reaction mixture and the sulfato dye compound is recovered by evaporation. It colors cellulose acetate, wool, nylon and silk textile materials red shades.

By the use of 51.5 grams of 2-(N-ethylsulfonamide) - 4 - nitrobenzeneazo-N-3,3-difluoro-n-butyl-N-β,γ-dihydroxypropylaniline in place of 2-(N-methylsulfonamide) - 4 - nitrobenzeneazo-N - 2,2-difluoroethyl-N-β-hydroxyethylaniline in the above example, a dye compound is obtained which colors cellulose acetate, wool, nylon and silk textile materials red shades.

EXAMPLE 27

23.1 grams of 2-N-methylsulfonamide-4-nitroaniline are diazotized in accordance with the procedure described in Example 1 and the diazonium compound obtained is coupled with 33.1 grams of the sodium salt of N-3,3-difluoro-n-butyl-N-β-sulfatoethylaniline. Coupling and recovery of the dye compound formed is carried out in accordance with the procedure described in Example 1. The dye compound obtained colors cellulose acetate, wool, nylon and silk red shades.

EXAMPLE 28

24.5 grams of 2-N-ethylsulfonamide-4-nitroaniline are diazotized in accordance with the procedure described in Example 1, and the diazonium compound obtained is coupled with 33.7 grams of sodium salt of N-2,2-difluoroethyl-N-β-sulfatoethyl - m - chloroaniline. Coupling and recovery of the dye compound formed is carried out in accordance with the procedure described in Example 1. The dye compound obtained colors cellulose acetate, wool, nylon and silk red shades.

By the use of 34.5 grams of the sodium salt of N-4,4-difluoro-n-amyl-N-β-sulfatoethylaniline in place of the sodium salt of N-2,2-difluoroethyl-N-β-sulfato-m-chloroaniline. In the above example a dye compound is obtained which colors cellulose acetate, wool, nylon and silk red shades.

EXAMPLE 29

23.1 grams of 2-N-methylsulfonamide-4-nitroaniline are diazotized in accordance with the procedure described in Example 1 and the diazonium compound obtained is coupled with 31.7 grams of the sodium salt of N-2,2-difluoroethyl-N-β-sulfatoethyl-m-toluidine. Coupling and recovery of the dye compound formed is carried out in accordance with the procedure described in Example 1. The dye compound obtained colors cellulose acetate, wool, nylon and silk rubine shades.

By the use of 31.7 grams of the sodium salt of N-2,2-difluoroethyl-N-γ-sulfatopropylaniline in place of the sodium salt of N-2,2-difluoroethyl - N - β - sulfatoethyl - m - toluidine. In the above example a dye compound is obtained which colors cellulose acetate, wool, nylon and silk red shades.

From the foregoing examples the manner of introducing a sulfato group into any of the azo compounds of my invention is believed to be clear, especially since the manner of introducing a sulfato group is known to those skilled in the art. Any other suitable way of introducing the sulfato group into the dye molecule can be employed. The sulfato group can be present in its free acid form or in the form of an inorganic or organic base salt such as, for example, the Na, K, NH₄, Mg, Ca, Li, methylamine, dimethylamine, trimethylamine, pyridine, aniline, guanidine, semicarbazide, biguanidine, phenyl guanidine, cyclohexylamine, dicyclohexylamine, tetrahydrofurfurylamine or alkanolamine salt form.

In order that the preparation of the azo compounds of my invention may be clearly understood, the preparation of certain intermediates used in their manufacture is described hereinafter.

EXAMPLE A

*4-nitro-2-trifluoromethyl-6-chloroaniline*

990 grams of concentrated hydrochloric acid and 500 grams of glacial acetic acid were placed in a 2-liter flask equipped with a chlorine inlet tube, a gas escape tube attached to a water trap, a mechanical stirrer, a thermometer and a cooling bath. Then 206 grams of finely powdered 4-nitro-2-trifluoromethylaniline were added to the mixed acids. The reaction mixture was cooled to 10° C. and about 73 grams of chlorine were gradually introduced with vigorous stirring over a period of 4 to 6 hours while keeping the temperature between 10° C.–15° C. The reaction proceeded rapidly without much evolution of heat and 4-nitro-2-trifluoromethyl-6-chloroaniline separated as a fine yellow solid. Toward the end of the chlorination, the rate of addition of chlorine was materially lowered to avoid decomposition of the 4-nitro-2-trifluoromethyl-6-chloroaniline.

When about 73 grams of chlorine (or until a sample gives the desired melting point) had been absorbed, the chlorine addition was stopped and the reaction mixture stirred for one hour to complete the reaction. The reaction mixture was then filtered on a Büchner funnel to recover the precipitated 4-nitro-2-trifluoromethyl-6-chloroaniline. The filter cake was washed with 100 grams of acetic acid and then with 175 grams of water.

After drying, the compound melted at 112° C.–114° C. and after crystallization from acetic acid it melted at 115° C.–116° C. The yield of 4-nitro-2-trifluoromethyl-6-chloroaniline was 228 grams which is 95% of the theoretical.

EXAMPLE B

*4-nitro-2-trifluoromethyl-6-bromoaniline*

20.6 grams of 4-nitro-2-trifluoromethylaniline were dissolved in 100 cc. of acetic acid and 16.8 grams of bromine in 100 cc. of acetic acid were gradually added at 40° C. The reaction mixture was placed on a steam bath for 4 hours under a condenser. Then it was cooled and poured into ice water. 4-nitro-2-trifluoromethyl-6-bromoaniline precipitated as a yellow solid and was recovered by filtration. The filter cake was washed with a water solution of $NaHSO_3$, then with water and dried. It melted at 140° C.–142° C. The yield was 26 grams.

EXAMPLE C

*4-nitro-2-methylsulfone-6-chloroaniline*

50 grams of 5-nitro-2-aminophenylmethylsulfone, 100 cc. of glacial acetic acid, 200 cc. of concentrated hydrochloric acid (sp. gr. 1.14) and 1 gram of $FeCl_3$ were placed in a flask and chlorine was bubbled in slowly, with stirring. The flask was kept in an ice bath to maintain the temperature at about 20° C.–25° C. Chlorine was bubbled in for about 4½ to 5 hours and then the reaction mixture was drowned in cold water. 4-nitro-2-methylsulfone-6-chloroaniline precipitated and was recovered by filtration. It was washed with cold water, then with a saturated solution of $NaHSO_3$ and finally with water. Upon drying and recrystallization from glacial acetic acid the product melted at 224° C.–225.5° C. Before recrystallization it melted at 214° C.–216° C. The yield was 47 grams.

EXAMPLE D

*4-nitro-2-methylsulfone-6-bromoaniline*

21.6 grams of 5-nitro-2-aminophenylmethylsulfone were placed in 200 cc. of glacial acetic acid and 16.5 grams of bromine were added dropwise with stirring. After about 6 hours the reaction mixture was warmed on a steam bath under a condenser. After 30 minutes the reaction mixture was cooled, poured into water and filtered. 4-nitro-2-methylsulfone-6-bromoaniline was obtained as yellowish crystals which were washed with aqueous $Na_2CO_3$ and dried. If desired, a purer product can be obtained by crystallization from hot acetic acid.

EXAMPLE E

*4-nitro-2-chloro-6-fluoroaniline*

90 grams of concentrated hydrochloric acid (sp. gr. 1.14), 50 grams of glacial acetic acid and 15.6 grams of 4-nitro-2-fluoroaniline were placed in a 3-necked 500 cc. round-bottomed flask, fitted with a stirrer and a thermometer. The reaction mixture resulting was cooled to 10° C.–15° C. and chlorine was slowly introduced to the stirred reaction mixture at 10° C.–15° C. until 7.5 grams had been taken up. This usually takes 2–4 hours. Stirring was continued for an additional hour and then the insoluble reaction product was recovered by filtration, washed with acetic acid and water and dried. 18.5 grams of 4-nitro-2-chloro-6-fluoroaniline were recovered as a yellow crystalline solid. It melts at 125° C.–127° C.

If desired, the chlorination can be carried out in a dilute sulfuric acid medium.

EXAMPLE F

*4-nitro-2-bromo-6-fluoroaniline*

This compound is obtained by the use of bromine in place of chlorine in Example E. It is a yellow crystalline solid.

Compounds having the formula:

IV 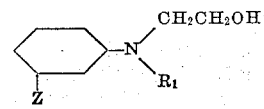

are prepared by reacting ethylene oxide with a compound having the formula:

V 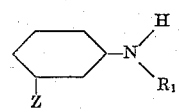

$R_1$ and Z in the foregoing formulas have the means previously assigned to them.

The following examples are illustrative of the manner in which the compounds of the formula numbered IV are prepared.

EXAMPLE G

*N-2,2-difluoroethyl-N-β-hydroxyethylaniline*

15.7 grams of N-2,2-difluoroethylaniline, 5.2 grams of ethylene oxide and 15 cc. of ethyl alcohol were sealed in a glass tube and heated at 200° C.–205° C. for 18–20 hours with shaking in an autoclave. Upon distillation of the reaction mixture under reduced pressure through a 10″ indented column, 18 grams of N-2,2-difluoroethyl-N-β-hydroxyethylaniline boiling at 123° C.–125° C./3 mm. were obtained. About 1.5 grams of N-2,2-difluoroethylaniline were also recovered.

EXAMPLE H

*N-2,2-difluoro-n-propyl-N-β-hydroxyethylaniline*

7.9 grams of N-2,2-difluoro-n-propylaniline, 1.9 grams of ethylene oxide and 10 cc. of ethyl alcohol were heated with shaking in a sealed tube for 8 hours at 185° C. The contents of the tube were cooled, removed from the tube and distilled under reduced pressure. About 3 grams of N-2,2-difluoro-n-propyl-N-β-hydroxyethylaniline boiling at 155° C.–160° C./11 mm. were obtained.

EXAMPLE I

*N-2,2-difluoro-n-propyl-N-β-hydroxyethyl-m-chloroaniline*

7.6 grams of N-2,2-difluoro-n-propyl-m-chloroaniline, 1.9 grams of ethylene oxide and 5 cc. of ethyl alcohol were heated with shaking in a sealed tube for 15 hours at 200° C. Then the contents of the tube were cooled, removed from the tube and distilled under reduced pressure. 3 grams of N-2,2-difluoro-n-propyl-N-β-hydroxyethyl-m-chloroaniline boiling at 165° C.–170° C./6 mm. were obtained.

EXAMPLE J

*N-3,3-difluoro-n-butyl-N-β-hydroxyethylaniline*

16.4 grams of N-3,3-difluoro-n-butylaniline and 4.4 grams of ethylene oxide dissolved in 10 cc. of ethyl alcohol were heated in a sealed tube at 180° C. for 24 hours. The resulting reaction mixture was fractionated under reduced pressure in a small helix-packed column. N-3,3-difluoro-n-butyl-N-β-hydroxyethylaniline, boiling point 140° C.–143° C./1.5 mm., $n_D^{20}$ 1.5142, was obtained in 84% yield.

EXAMPLE K

*N-4,4-difluoro-n-amyl-N-β-hydroxyethylaniline*

10 grams of N-4,4-difluoro-n-amylaniline, 2.6 grams of ethylene oxide and 10 cc. of ethyl alcohol were heated, with shaking, in a sealed tube at 200° C. for 15 hours. The reaction mixture was cooled, removed from the tube and distilled under reduced pressure. 10 grams of N-4,4-difluoro-n-amyl-N-β-hydroxyethylaniline boiling at 179° C.–172° C./7 mm. were obtained.

In a manner similar to that described in Examples G, H, I, J and K, N-2,2-difluoroethyl-N-β-hydroxyethyl-m-chloroaniline, B. P. 180° C.–182° C./14 mm.; N-2,2-difluoroethyl-N-β-hydroxyethyl-m-toluidine, B. P. 120° C./2 mm.; N-3,3-difluoro-n-butyl-N-β-hydroxyethyl-m-toluidine, B. P. 135° C./1 mm., $n_D^{20}$ 1.5165; N-3,3-difluoro-n-butyl-N-β-hydroxyethyl-m-chloroaniline, B. P. 162° C./1.5 mm., $n_D^{20}$ 1.5300; N-2,2-difluoroethyl-N-β-hydroxyethyl-m-toluidine, B. P. 155° C.–158° C./7 mm.; N-2,2-difluoro-n-propyl-N-β-hydroxyethyl-m-ethylaniline, B. P. 130° C.–132° C./1 mm.; N-4,4-difluoro-n-amyl-N-β-hydroxyethyl-m-chloroaniline, B. P. 165° C.–168° C./1 mm.; N-3,3-difluoro-n-propyl-N-β-hydroxyethylaniline, B. P. 135° C.–136° C./2 mm.; N-3,3-difluoro-n-propyl-N-β-hydroxyethyl-m-toluidine, B. P. 130° C./1 mm.; N-3,3-difluoro-n-propyl-N-β-hydroxyethyl-m-ethylaniline, B. P. 131° C.–132° C./1 mm.; N-2,2-difluoroethyl-N-β-γ-dihydroxypropylaniline, M. P. 46° C.–53° C.; N-2,2-difluoro-n-propyl-N-β-hydroxyethyl-m-ethylaniline, B. P. 131° C.–132° C./1 mm.; etc., are prepared.

Compounds having the formula:

VI 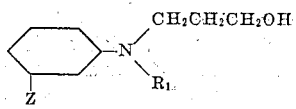

wherein $R_1$ and $Z$ have the meaning previously assigned to them are prepared by reacting trimethylene chlorohydrin or trimethylene bromohydrin with a compound having the formula V.

The following examples are illustrative of the manner in which the compounds having the formula numbered VI are prepared.

EXAMPLE L

*N-3,3-difluoro-n-propyl-N-γ-hydroxypropylaniline*

51.3 grams of N-3,3-difluoro-n-propylaniline and 30 grams of trimethylene chlorohydrin were heated together on a steam bath for 10 hours. The reaction mixture was cooled and 10% aqueous NaOH was added thereto until it was alkaline. The reaction mixture was treated with benzene and the benzene portion was removed, washed with water and then distilled under reduced pressure. N-3,3-difluoro-n-propyl-N-γ-hydroxypropylaniline boiling at 122° C.–126° C./1–2 mm. was obtained.

EXAMPLE M

*N-2,2-difluoroethyl-N-γ-hydroxypropyl-m-toluidine*

51.3 grams of N-2,2-difluoroethyl-m-toluidine were reacted with 30 grams of trimethylene chlorohydrin in accordance with the procedure described in Example L. N-2,2-difluoroethyl-N-γ-hydroxypropyl-m-toluidine boiling at 134° C.–138° C./2 mm. was obtained.

EXAMPLE N

*N-2,2-difluoro-n-propyl-N-γ-hydroxypropylaniline*

51.3 grams of N-2,2-difluoro-n-propylaniline, 46.4 grams of trimethylenebromohydrin and 30.5 grams of NaHCO₃ were heated at 140° C. for 6 hours with stirring. Upon cooling benzene was added to the reaction mixture and the reaction mixture was filtered. The benzene was removed from the filtrate and the portion remaining was distilled under reduced pressure to obtain N-2,2-difluoro-n-propyl-N-γ-hydroxypropylaniline boiling at 137° C.–140° C./1 mm.

Following the procedure described in Examples L, M and N, N-2,2-difluoro-n-propyl-N-γ-hydroxypropyl-m-chloroaniline, N-2,2-difluoro-n-propyl-N-γ-hydroxypropyl-m-toluidine, N-3,3-difluoro-n-propyl-N-γ-hydroxypropyl-m-toluidine, N-3,3-difluoro-n-butyl-N-γ-hydroxypropyl-m-toluidine boiling at 183° C.–186° C./6 mm., N-3,3-difluoro-n-butyl-N-γ-hydroxypropyl-m-chloroaniline boiling at 190° C.–195° C./6 mm.; N-2,2-difluoroethyl-N-γ-hydroxypropylaniline boiling at 117° C.–121° C./1–2 mm., and N-3,3-difluoro-n-butyl-N-γ-hydroxypropylaniline boiling at 178° C.–180° C./6 mm. are obtained.

EXAMPLE O

N-4,4-difluoro-n-amyl-N-γ-hydroxypropylaniline 100 grams of N-4,4-difluoro-n-amylaniline and 30 grams of trimethylene chlorohydrin were heated together on a steam bath for 10 hours. The reaction mixture was cooled and made just basic by adding 10% aqueous NaOH. Benzene was added to the reaction mixture and the reaction mixture was filtered. The filtrate was washed with water and the benzene portion was distilled under reduced pressure. N-4,4-difluoro-n-amyl-N-γ-hydroxypropylaniline boiling at 180° C.–185° C./7 mm. was obtained. It is a heavy colorless liquid.

Similarly N-4,4-difluoro-n-amyl-γ-hydroxypropyl-m-chloroaniline and N-4,4-difluoro-n-amyl-γ-hydroxypropyl-m-ethylaniline, B. P. 185° C.–189° C./6 mm., for example, are obtained.

Compounds having the formula:

VII 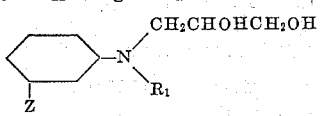

wherein $R_1$ and Z have the meaning previously assigned to them are prepared by reacting glycerol chlorohydrin with a compound having the Formula V.

The following examples are illustrative of the manner in which the compounds of the formula numbered VII are prepared.

EXAMPLE P

N-2,2-difluoro-n-propyl-N-β,γ-dihydroxypropylaniline 17 grams of N-2,2-difluoro-n-propylaniline, 10 grams of NaHCO$_3$, 100 cc. of amyl alcohol and 12 grams of glyceryl chlorohydrin were heated together under refluxing conditions for 6–10 hours. Then 2 grams of charcoal were added and the reaction mixture was stirred and filtered to remove the charcoal, salt and any other insoluble material. The amyl alcohol was removed by distillation under reduced pressure and then the reaction mixture was steam-distilled under reduced pressure to remove any unchanged N-2,2-difluoro-n-propylaniline. Following this the reaction mixture was extracted with benzene and the benzene extract was distilled to dryness under reduced pressure. N-2,2-difluoro-n-propyl-N-β,γ-dihydroxypropylaniline was obtained. It is a straw colored, viscous compound.

EXAMPLE Q

N-3,3-difluoro-n-butyl-N-β,γ-dihydroxypropylaniline 9 grams of N-3,3-difluoro-n-butylaniline and 4.6 grams of NaHCO$_3$ were stirred and heated together at 145° C. by means of an oil bath while 6.1 grams of glyceryl chlorohydrin were slowly added. After the addition, heating and stirring at 145° C. were continued for 6 hours. The evolution of carbon dioxide ceased after an hour. An equal volume of water was then added to the reaction mixture and the reaction mixture was extracted three times with benzene. The benzene solution was steam-distilled, leaving the reaction product as an oily residue. The yield of crude N-3,3-difluoro-n-butyl-N-β,γ-dihydroxypropylaniline was 95%. Upon distilling the crude product in a molecular still (i. e. a Hickman molecular still manufactured by Distillation Products, Inc., Rochester, N. Y.) under a reduced pressure of 22 microns at 110° C.–125° C., N-3,3-difluoro-n-butyl-N-β,γ-dihydroxypropylaniline was obtained as a clear, very viscous oil $N_D^{20}$ 1.5230.

EXAMPLE R

N-3,3-difluoro-n-butyl-N-β,γ-dihydroxypropyl-m-toluidine 12 grams of N-3,3-difluoro-n-butyl-m-toluidine, 5.6 grams of NaHCO$_3$ and 7.3 grams of glyceryl chlorohydrin were heated together at 145° C. for 7 hours in accordance with the procedure described in Example P. The crude reaction product thus obtained was distilled in a molecular still (i. e. a Hickman molecular still manufactured by Distillation Products, Inc., Rochester, N. Y.) under a reduced pressure of 11–14 microns at a temperature of 110° C. N-3,3-difluoro-n-butyl-N-β,γ-dihydroxypropyl-m-toluidine was obtained. Upon recrystallization from hexane it melted at 81° C.

EXAMPLE S

N-2,2-difluoroethyl-N-β,γ-dihydroxypropyl-m-toluidine

This compound was obtained by reacting 10.3 grams of N-2,2-difluoroethyl-m-toluidine, 5.6 grams of NaHCO$_3$ and 7.3 grams of glyceryl chlorohydrin together in accordance with the procedure described in Example Q.

EXAMPLE T

N-4,4-difluoro-n-amyl-N-β,γ-dihydroxypyropylaniline 20 grams of N-4,4-difluoro-n-amylaniline, 10 grams of NaHCO$_3$, 100 cc. of amyl alcohol and 12 grams of glyceryl chlorohydrin are heated together under refluxing conditions for 6–10 hours. Then 2 grams of charcoal are added and the reaction mixture is stirred and filtered to remove the charcoal, salt and any other insoluble material. Upon working up the reaction mixture in accordance with the procedure described in Example P, N-4,4-difluoro-n-amyl-N-β,γ-dihydroxypropylaniline is obtained. It is a straw-colored, very viscous compound.

Following the procedure described in Examples P, Q, R, S and T, N-2,2-difluoro-n-propyl-N-β,γ-dihydroxypropyl-m-chloroaniline, N-2,2-difluoro-n-propyl-N-β,γ-dihydroxypropyl-m-toluidine, N-3,3-difluoro-n-propyl-N-β,γ-dihydroxypropylaniline, N-2,2-difluoroethyl-N-β,γ-dihydroxypropylaniline, N-3,3-difluoro-n-propyl-N-β,γ-dihydroxypropyl-m-chloroaniline, N-4,4-difluoro-n-amyl-N-β,γ-dihydroxypropyl-m-toluidine, N-2,2-difluoroethyl-N-β,γ-dihydroxypropyl-m-ethylaniline; etc. are prepared.

Compounds having the formula numbered V are prepared by reacting a compound having the formula:

VIII 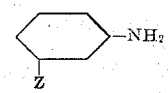

with 1,1-difluoro-2-bromoethane or 1,1-difluoro-2-chloroethane, 3,3-difluoro-n-propylbromide (CHF$_2$CH$_2$CH$_2$Br), 2,2-difluoro-n-propylbromide (CH$_3$CF$_2$CH$_2$Br), 3,3-difluoro-n-butylchloride (CH$_3$CF$_2$CH$_2$CH$_2$Cl) and 4,4-difluoro-n-amylchloride (CH$_3$CF$_2$CH$_2$CH$_2$CH$_2$Cl), respectively.

The following examples are illustrative of the manner in which the compounds of the formula numbered V are prepared.

EXAMPLE U

N-2,2-difluoroethylaniline 72.5 grams of 1,1-difluoro-2-bromethane, 46.5 grams of aniline, 42 grams of sodium bicarbonate and 1 gram of sodium iodide were heated together with shaking in an autoclave for 15 hours at 150° C. After cooling to room temperature, the reaction mixture was removed from the autoclave by washing with benzene (200 grams) and water and filtered to remove a small amount of insoluble material. The benzene layer was washed with water and then the benzene was removed by distillation. Upon distillation under reduced pressure through a 12'' indented column, 66 grams of N-2,2-difluoroethylaniline, boiling at 104° C.–106° C./19 mm. was obtained.

EXAMPLE V

N-2,2-difluoro-n-propylaniline 28 grams of aniline, 43 grams of 2,2-difluoro-n-propylbromide, 25 grams of sodium bicarbonate and 1 gram of sodium iodide were placed in an autoclave and heated 24 hours at 170° C. with shaking. The reaction mixture was then cooled, washed out of the autoclave with benzene and filtered. The benzene was then removed from the filtrate and the residue containing the desired reaction product was distilled under reduced pressure. A good yield of N-2,2-difluoro-n-propylaniline boiling at 103° C.–107° C./12 mm. was obtained.

EXAMPLE W

N-3,3-difluoro-n-propylaniline

By the use of 43 grams of 3,3-difluoro-n-propylbromide in place of 2,2-difluoro-n-propylbromide in Example W, N-3,3-difluoro-n-propylaniline boiling at 125° C.–126° C./16 mm. was obtained.

Following the procedure described in Examples U, V and W, N-2,2-difluoroethyl-m-toluidine, B. P. 140° C.–141° C./27 mm.; N-2,2-difluoroethyl-m-chloroaniline, B. P. 129° C.–133° C./16 mm.; N-2,2-difluoro-n-propyl-m-toluidine, B. P. 115° C.–117° C./12 mm; N-2,2-difluoro-n-propyl-m-ethylaniline, B. P. 120° C.–123° C./12 mm.; N-2,2-difluoro-n-propyl-m-chloroaniline, B. P. 115° C.–120° C./7 mm.; N-2,2-difluoro-n-propyl-m-bromoaniline, B. P. 125° C.–128° C./7 mm.; N-3,3-difluoro-n-propyl-m-toluidine, B. P. 146° C.–147° C./27 mm.; N-3,3-difluoro-n-propyl-m-chloroaniline, B. P. 110° C.–114° C./4 mm.; N-2,2-difluoroethyl-m-ethylaniline, B. P. 103° C.–108° C./7 mm.; etc., are prepared.

EXAMPLE X

N-3,3-difluoro-n-butylaniline

A mixture of 24 grams of 3,3-difluoro-n-butylchloride ($CH_3CF_2CH_2CH_2Cl$) and 35.3 grams of aniline were heated in a sealed tube at 160° C. for 24 hours. Upon cooling, the tube was opened and the oily solid content was washed out with a 10% aqueous sodium hydroxide solution, yielding an oil. The aqueous phase of the reaction mixture was extracted with ether, and the ether extract was combined with the oil. After drying the ether solution over $K_2CO_3$, the ether was removed, and the residue was fractionated under reduced pressure in a small helix-packed column. A 54% yield of N-3,3-difluoro-n-butylaniline boiling at 122° C.–123° C./10 mm., $n_D^{20}$ 1.5087, was obtained.

In like manner, N-3,3-difluoro-n-butyl-m-toluidine boiling at 135° C.–136° C./10 mm., $n_D^{20}$ 1.5054; N-3,3-difluoro-n-butyl-m-chloroaniline boiling at 149° C.–151° C./8 mm., $n_D^{20}$ 1.5330, for example, are obtained.

EXAMPLE Y 28.5 grams of 4,4-difluoro-n-amylchloride and 37 grams of aniline are heated together in an Erlenmeyer flask on a steam bath for 36 hours. The reaction mixture is cooled and made alkaline by the addition of 10% aqueous NaOH. Then the reaction mixture is extracted with benzene and the benzene extract is distilled under reduced pressure. N-4,4-difluoro-n-amylaniline boiling at 101° C.–102° C./2 mm. is obtained.

Following the procedure described in Example Y, N-4,4-difluoro-n-amyl-m-toluidine, B. P. 153° C.–155° C./11 mm.; N-4,4-difluoro-n-amyl-m-chloroaniline, B. P. 152° C.–154° C./8 mm.; etc., were prepared.

1,1-difluoro-3-bromopropane ($CHF_2CH_2CH_2Br$)

appears to be a new compound. It was prepared as described hereinafter.

EXAMPLE Z

Preparation of 1,1-difluoro-3-bromopropane 98 grams of 1,1,3-tribromopropane were placed in a 200 cc. round bottomed flask fitted with a still-head and a well-cooled receiving flask. 107 grams of dry mercuric fluoride were then added and the reaction flask was gently heated with a free flame until reaction began. The reaction was then allowed to proceed briskly but not too vigorously (by cooling in a bath of ice water or heating, as required) until all the reaction product has distilled over at about 85° C.–100° C. The crude product was then steam-distilled, dried and fractionated. The main product was 1,1-difluoro-3-bromopropane, boiling point 92° C.–94° C. Using this procedure yields of 35–40% of pure 1,1-difluoro-3-bromopropane are obtained. A small amount of $CH_2FCH_2CH_2Br$ was present in the residue.

1,1,3-tribromopropane ($CHBr_2CH_2CH_2Br$) likewise appears to be a new compound. It was prepared as described hereinafter.

EXAMPLE AA

Preparation of 1,1,3-tribromopropane 1000 grams of bromoform and 30 grams of benzoyl peroxide were placed in a 1100 cc. shaking autoclave and ethylene was passed into the autoclave until a pressure of 700 lbs. per square inch was reached. The reaction mixture was then heated at 85° C. for 15 hours following which it was cooled, removed from the autoclave and fractionated under reduced pressure. About 600 grams of 1,1,3-tribromopropane boiling at 105° C.–107° C./30 mm. were obtained. Using the procedure just described or generally similarly procedures somewhat higher and somewhat lower yields were obtained. As high as 700 grams have been obtained. Also 100–150 grams of bromoform, 20–30 grams of a low boiling liquid and varying amounts of higher boiling compounds are recovered.

The azo dye compounds of my invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

The procedure just described is applicable whether the dye compound contains a sulfato group or not. The dye compounds of the invention not containing a sulfato group are practically water-insoluble. Where a sulfato group is present, the water solubility is increased and in such case a greater amount of the dye will go into solution.

Widely varying amounts of dye can be used in the dyeing operation. The amount of dye used can be, for example, ⅓ to 3% (by weight) of that of the textile material although lesser or greater amounts of dye can be employed.

This application is continuation-in-part of my copending application Serial No. 109,056, filed August 6, 1949. It is also a continuation-in-part of my application Serial No. 631,468, filed November 28, 1945, now U. S. Patent 2,516,302. N-difluoroalkylaminobenzene compounds are described and claimed in my application Serial No. 624,943, filed October 26, 1945, now U. S. Patent 2,516,107. Applications Serial Nos. 631,468 and 624,943 were copending with my copending application Serial No. 109,056.

I claim:

1. The azo compounds having the formula:

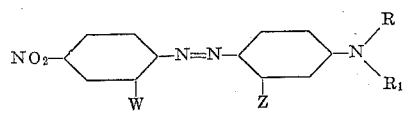

wherein R represents a member selected from the group consisting of a β-sulfatoethyl group, a γ-sulfatopropyl group and a sulfated β,γ-dihydroxypropyl group, R₁ represents a member selected from the group consisting of a 2,2-difluoroethyl group, a 2,2-difluoro-n-propyl group, a 3,3-difluoro-n-propyl group, a 3,3-difluoro-n-butyl group and a 4,4-difluoro-n-amyl group, Z represents a member selected from the group consisting of a hydrogen atom, a bromine atom, a chlorine atom, a methyl group and an ethyl group and W represents a member selected from the group consisting of a

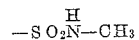

group and a

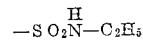

group.

2. The azo compound having the formula:

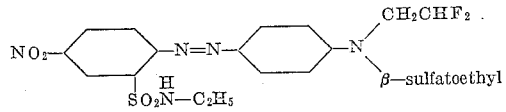

3. The azo compound having the formula:

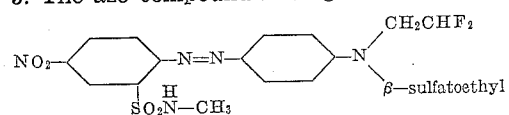

4. The azo compound having the formula:

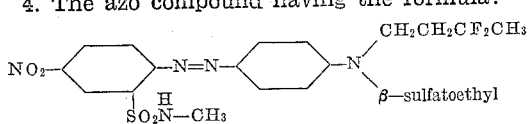

5. The azo compound having the formula:

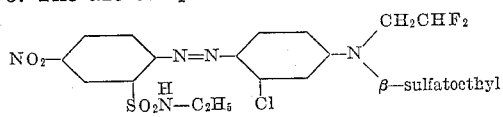

6. The azo compound having the formula:

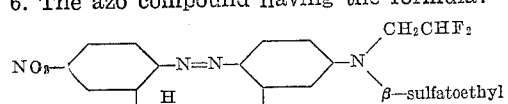

JOSEPH B. DICKEY.

No references cited.